(12) United States Patent
Johnson

(10) Patent No.: US 11,326,497 B2
(45) Date of Patent: May 10, 2022

(54) EXHAUST GAS ENERGY RECOVERY CONVERTER

(71) Applicant: Johnson IP Holding, LLC, Atlanta, GA (US)

(72) Inventor: Lonnie G. Johnson, Atlanta, GA (US)

(73) Assignee: Johnson IP Holding, LLC, Atlanta, GA (US)

( * ) Notice: Subject to any disclaimer, the term of this patent is extended or adjusted under 35 U.S.C. 154(b) by 0 days.

(21) Appl. No.: 17/269,102

(22) PCT Filed: Aug. 22, 2019

(86) PCT No.: PCT/US2019/047599
§ 371 (c)(1),
(2) Date: Feb. 17, 2021

(87) PCT Pub. No.: WO2020/041535
PCT Pub. Date: Feb. 27, 2020

(65) Prior Publication Data
US 2021/0310392 A1    Oct. 7, 2021

Related U.S. Application Data

(60) Provisional application No. 62/720,996, filed on Aug. 22, 2018.

(51) Int. Cl.
*F01N 5/00* (2006.01)
*B01D 53/32* (2006.01)
*F01N 3/10* (2006.01)

(52) U.S. Cl.
CPC .............. *F01N 5/00* (2013.01); *B01D 53/326* (2013.01); *F01N 3/101* (2013.01); *F01N 3/103* (2013.01);

(Continued)

(58) Field of Classification Search
CPC .......... F01N 3/101; F01N 3/103; F01N 3/108; F01N 5/00
See application file for complete search history.

(56) References Cited

U.S. PATENT DOCUMENTS 7,160,639 B2    1/2007   Johnson et al.
8,261,862 B2 *  9/2012   Uchiyama .............. B60W 10/08
                                              180/65.265

(Continued)

FOREIGN PATENT DOCUMENTS

| AU | 2012261639 B2 | 2/2014 |
| DE | 10026941 A1 | 12/2001 |
| EP | 2591843 A1 | 5/2013 |

OTHER PUBLICATIONS

International Search Report and Written Opinion dated Nov. 11, 2019 in International Application No. PCT/US2019/047599.

*Primary Examiner* — Jonathan R Matthias
(74) *Attorney, Agent, or Firm* — Panitch Schwarze Belisario & Nadel LLP

(57) ABSTRACT

An energy recovery converter for exhaust gases or waste heat is provided. The converter includes a membrane electrode assembly (MEA), an exhaust gas having a first molecular oxygen content, and an external electrical load. The MEA includes a first electrode, a second electrode and an oxygen ion conductive membrane sandwiched between the first and second electrodes. Each of the first and second electrodes includes at least one oxidation catalyst configured to promote an electrochemical reaction. The second electrode of the MEA is exposed to the exhaust gas and the first electrode of the MEA is exposed to a gas having a second molecular oxygen content. The second molecular oxygen content is higher than the first molecular oxygen content. The external electrical load is connected between the first and second electrodes of the MEA.

9 Claims, 5 Drawing Sheets

(52) U.S. Cl.
CPC .......... *F01N 3/108* (2013.01); *F01N 2570/10* (2013.01); *F01N 2570/12* (2013.01); *F01N 2570/14* (2013.01)

(56) References Cited

U.S. PATENT DOCUMENTS

| | | | |
|---|---|---|---|
| 2004/0166386 A1 | 8/2004 | Herman et al. | |
| 2006/0096277 A1* | 5/2006 | Surnilla | F01N 13/009 60/286 |
| 2007/0186537 A1* | 8/2007 | Elwart | F01N 13/009 60/285 |
| 2007/0186544 A1* | 8/2007 | Elwart | H01M 8/12 60/299 |
| 2007/0186545 A1* | 8/2007 | Elwart | H01M 8/04201 60/299 |
| 2007/0186876 A1* | 8/2007 | Elwart | F01N 3/108 123/2 |
| 2007/0190377 A1* | 8/2007 | Elwart | H01M 8/04373 429/416 |

* cited by examiner

EXHAUST GAS ENERGY RECOVERY CONVERTER

CROSS-REFERENCE TO RELATED APPLICATIONS

This application is a Section 371 of International Application No. PCT/US19/47599, filed Aug. 22, 2019, which was published on Feb. 27, 2020, under International Publication No. WO 2020/041535 A1, which claims priority to U.S. Provisional Application No. 62/720,996, filed on Aug. 22, 2018, the disclosures of which are incorporated herein by reference in their entireties.

BACKGROUND OF THE INVENTION

The present invention relates to an energy recovery converter for exhaust gases or waste heat.

The fuel combustion and energy conversion efficiencies of mechanical engines, particularly internal combustion engines, are well understood to be long standing challenges. Piston-type internal combustion engines operate on the Otto cycle, wherein low temperature ambient air is compressed by a piston and then heated to a very high temperature via fuel combustion inside the cylinder of the engine. Expansion of the heated air against the piston as the cycle continues produces more work than is consumed during the initial compression of the air at the low temperature. Other engines, such as combustion turbines and scram jets, are also in the internal combustion category, although they operate on different thermodynamic cycles. For example, such other engines may operate on thermodynamic cycles wherein shaft work is performed using a piston or turbine to compress a working fluid at a low temperature, and then the temperature of the working fluid is increased such that the working fluid is allowed to expand against a load, such as a piston or turbine, thereby producing shaft work. The key to the operation of all engines employing a working fluid is that it requires less work to compress the working fluid at a low temperature than the work produced by expanding it at a high temperature. This is the case for all thermodynamic engines employing a working fluid.

Referring to FIG. 1, there is shown a representative graph of exhaust gas temperatures of a piston-type internal combustion engine as a function of engine speed in rotations per minute (rpm). It is generally understood that exhaust temperature increases with engine power output, and is directly related to engine inefficiency and the engine's need to dissipate waste heat. Problems associated with engine inefficiency are essentially two-fold: 1) the percentage of energy available from the fuel that is converted into useful work is limited, and 2) combustion products from the engine include toxic gasses such as NOx, carbon monoxide and partially burned hydrocarbons.

Catalytic converters have been developed to oxidize and reduce, as appropriate, the toxic gases in the exhaust stream. However, catalytic converters also generate waste heat as they catalyze reduction of NOx and complete combustion of remaining fuel products, carbon monoxide (CO) and hydrocarbons (HC) that have not completely burned. The auto industry has long been engaged in efforts to utilize the waste heat from exhaust gases. However, prior efforts have yielded limited success, primarily because of cost and/or low efficiency of the available technology.

One approach that received a great deal of attention was the use of semiconductor thermoelectric converters based on the Seebeck effect. However, existing semiconductor thermoelectric converters provide, at best, approximately 6% conversion efficiency at the operating engine exhaust temperatures. In order to operate, thermoelectric converters must be heated on one side and cooled on the other side. More particularly, one side is heated by engine waste heat, and coolant flow loops or other active cooling is needed to cool the other side. The complexity associated with coolant loops, which can include heat exchangers, ceramic plates, pumps and fans, needed to implement existing semiconductor thermoelectric converters made this approach expensive to an extent that their use could not be justified, particularly considering the relatively low efficiency and associated small amount of power generated. System costs for balance of plant components needed to maintain a low temperature relative to the hot engine exhaust have not yielded a cost-effective solution.

Advanced quantum thermoelectric-based devices having an ultimate efficiency goal of 15% have also been developed. However, it is uncertain if the nanostructure required for quantum well devices could be maintained during operation at temperatures above about 200° C., because of molecular diffusion and migration issues. A 200° C. temperature limitation for quantum well devices would mean that they would not be able to exceed 15% conversion efficiency, even if their performance is in the range of 50% of Carnot. It is also not clear that construction of quantum well thermoelectric devices would be scalable from a manufacturing perspective.

Another type of thermo-electrochemical converter, disclosed in U.S. Pat. No. 7,160,639 filed on Apr. 28, 2003, the disclosure of which is incorporated herein by reference, has also been developed. This thermo-electrochemical converter uses an electrochemical process with an ionizable gas (hydrogen or oxygen) as a working fluid to produce power. Two electrochemical membrane electrode assembly (MEA) cell stacks, similar to those used in fuel cells, perform the required heat engine compression and expansion processes, with one MEA stack operating at a relatively low temperature and the other MEA stack operating at a relatively high temperature. Working fluid circulates in a continuous loop between the two MEA stacks. Electrical power is applied to the low temperature MEA stack to compress working fluid, as power is produced in the high temperature MEA stack by expansion of the working fluid. As in any engine, more power is produced during the high temperature expansion than is consumed during the low temperature compression.

This converter's performance is manifested in the form of the low temperature MEA stack operating at a lower voltage than the high temperature MEA stack, in accordance with the Nernst equation. That is, the low temperature MEA stack compresses hydrogen at a relatively low voltage and the high temperature MEA stack expands hydrogen at a relatively high voltage. The difference in voltage between the two MEA stacks is applied across an external load. The working fluid (e.g., hydrogen) circulates continuously inside the engine and is never consumed. The current flow through the two MEA stacks and the external load is the same. Similar to thermoelectric converters based on the Seebeck effect, this type of converter requires a temperature differential relative to the engine exhaust heat in order to operate. This type of converter is more cost effective than the converters based on the Seebeck effect, because of its higher efficiency and associated higher power output, but still remains relatively complex to implement because cooling is required to maintain the temperature differential.

The catalytic converter of the present invention provides an improved device and method to oxidize and/or reduce toxic gases in exhaust or waste gas of a mechanical engine.

SUMMARY OF THE INVENTION

In one embodiment, the present invention relates to an energy recovery converter for exhaust gases or waste heat. The converter includes a membrane electrode assembly (MEA), an exhaust gas having a first molecular oxygen content, and an external electrical load. The MEA includes a first electrode, a second electrode and an oxygen ion conductive membrane sandwiched between the first and second electrodes. Each of the first and second electrodes includes at least one oxidation catalyst configured to promote an electrochemical reaction. The second electrode of the MEA is exposed to the exhaust gas and the first electrode of the MEA is exposed to a gas having a second molecular oxygen content. The second molecular oxygen content is higher than the first molecular oxygen content. The external electrical load is connected between the first and second electrodes of the MEA.

In another embodiment, the present invention relates to a method for purifying exhaust gas from a mechanical engine using a converter. The converter includes a catalytic reduction chamber, membrane electrode assembly (MEA), an exhaust gas, and an external electrical load. The MEA includes a first electrode, a second electrode and an oxygen ion conductive membrane sandwiched between the first and second electrodes. Each of the first and second electrodes includes at least one oxidation catalyst configured to promote an electrochemical reaction. The exhaust gas contains hydrocarbons, nitrogen oxides and water, and has a first molecular oxygen content. The second electrode of the MEA is exposed to the exhaust gas and the first electrode of the MEA is exposed to a gas having a second molecular oxygen content such that oxygen contained within the gas enters the first electrode. The second molecular oxygen content is higher than the first molecular oxygen content. The external electrical load is connected between the first and second electrodes of the MEA. The method includes transporting the exhaust gas to the catalytic reduction chamber, such that the hydrocarbons, nitrogen oxides and water of the exhaust gas are converted to reaction gases, the reaction gases being elemental hydrogen, carbon monoxide, carbon dioxide and elemental nitrogen; transporting a stream containing the reaction gases, water and any unburned hydrocarbons from the catalytic reduction chamber to the second electrode; oxidizing the oxygen from the gas having the second molecular oxygen content to produce oxygen ions, such that the oxygen ions are conducted through the oxygen ion conductive membrane and electrons are simultaneously released to the external electrical circuit; and transporting the electrons from the external electrical circuit to the first electrode to combine with the oxygen ions and for an oxidation reaction with the carbon monoxide and unburned hydrocarbons at their respective reaction potentials.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 2:
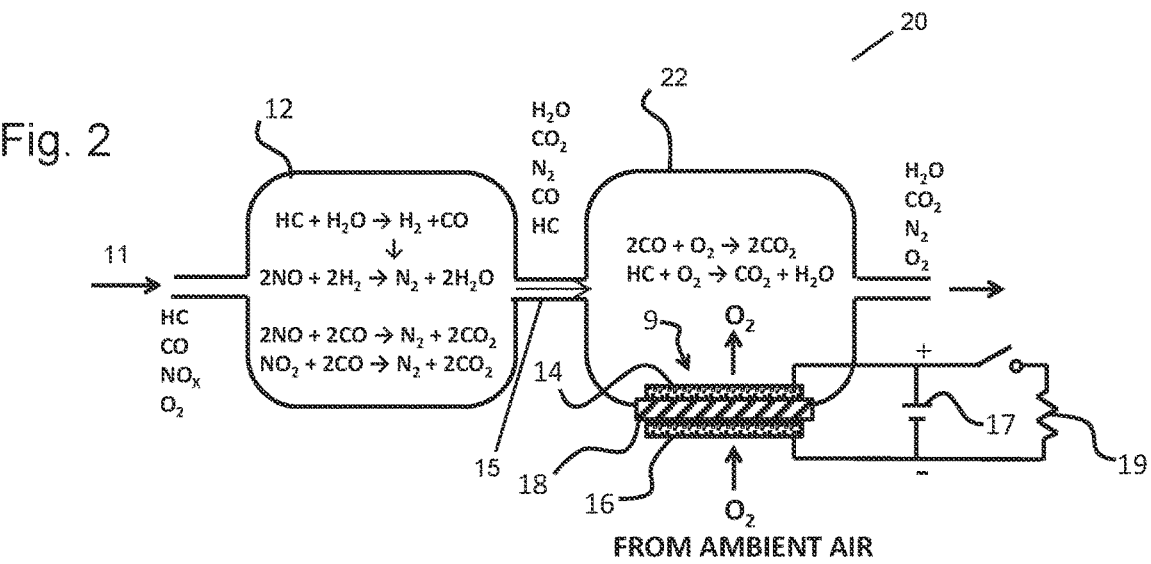
FIG. 2 provides a schematic view of a three-way catalytic converter according to a preferred embodiment of the present invention.

Referring to FIG. 2, there is shown an energy recovery converter 20 for exhaust gases or waste heat, namely a catalytic converter 20, and more particularly a three-way type catalytic converter 20, according to the present invention. The catalytic converter 20 reduces toxic gases and pollutant in exhaust gas, such as from an internal combustion engine, into less-toxic or harmful exhaust gas. The catalytic converter 20 includes a first chamber 12 and a second chamber 22. The first chamber 12 includes one or more reduction catalysts (and is therefore a catalytic reduction chamber) and the second chamber 22 includes one or more oxidation catalysts (and is therefore a catalytic oxidation chamber). Examples of the reduction catalysts include, but are not limited to, rhodium, platinum, transition metal macrocycles and chalgogenides. In a preferred embodiment, the reduction catalyst of the first chamber 12 is rhodium metal, and more particularly finely divided rhodium metal.

Engine exhaust gas or waste heat flow 11, herein generally referred to as exhaust gas, is initially provided to the first chamber 12 of the catalytic converter 20. In the first chamber 12, the reduction catalyst of the first chamber 12 reduces unburned hydrocarbons and water in the exhaust gas to form elemental hydrogen $H_2$, by the following reaction:

Hydrocarbons+$H_2O \rightarrow H_2$+CO

The elemental hydrogen produced in this reaction then reacts with nitrogen oxides in the exhaust gas, thereby reducing them to elemental nitrogen, by the following reaction:

$2NO+2H_2 \rightarrow N_2+2H_2O$

The carbon monoxide formed from the reduction of the hydrocarbons and water is also available to reduce nitrogen oxides in the exhaust gas to elemental nitrogen and carbon dioxide, by the following reactions:

$$2NO+2CO \rightarrow N_2+2CO_2$$

$$2CO+NO_2 \rightarrow N_2+2CO_2$$

The stream 15 of reaction gases, water and partially combusted hydrocarbons then exits the first chamber 12 and travels to the second chamber 22. The second chamber 22 is equipped with, includes or is formed by an oxygen conductive membrane electrode assembly (MEA) stack 9. The MEA stack 9 includes first and second electrodes 14, 16 which sandwich an ion conductive membrane 18. The first electrode 14 is a cathode and the second electrode 16 is an anode. Each of the first and second electrodes 14, 16 contains a catalyst, and more preferably an oxidation catalyst. Examples of the oxidation catalysts that may be used include, but are not limited to, platinum, palladium, metal oxides, transition metal macrocycles and chalgogenides. Preferably, the oxidation catalyst contained in each of the first and second electrodes 14, 16 is a platinum/palladium catalyst.

Ambient air from the surrounding environment is introduced into the second chamber 22 through the MEA stack 9. More particularly, under the oxygen partial pressure differential between ambient air and the exhaust gas, the oxygen contained within the ambient air enters the anode 16 where it is oxidized by the catalyst contained therein. The resulting oxygen ions are conducted through the ion conductive membrane 18, as the released electrons are simultaneously released to an external circuit, such as an external load 19 or energy storage device 17. The circuit is completed at the cathode 14, where electrons from the external circuit combine with the oxygen ions conducted through the ion conductive membrane 18, for an oxidation reaction with carbon monoxide and any unreacted hydrocarbons at their respective reaction potentials.

Specifically, the partially combusted (i.e., any remaining unburned) hydrocarbons react with the oxygen conducted through the MEA stack 9 and are converted to carbon dioxide and water, and the carbon monoxide generated in the first chamber 12 and introduced into the second chamber 22 reacts with the oxygen conducted through the MEA stack 9 to form carbon dioxide, by the following reactions:

$$2CO+O_2 \rightarrow 2CO_2$$

$$Hydrocarbons+O_2 \rightarrow H_2O+CO_2$$

In addition to the oxidation reactions in the second chamber 22, power is also produced by the converter 20 under the oxygen partial pressure differential between ambient air and the exhaust gas. Power drawn under the Nernst potential results in an increase in the oxygen content in the exhaust stream, due to the additional oxygen introduced into the converter 20 via the MEA stack 9. More particularly, in addition to the electrochemical reaction potentials of the unreacted combustion products, the high temperature of the exhaust and its low oxygen partial pressure relative to the oxygen partial pressure of oxygen in ambient air produces a voltage in accordance with the Nernst equation:

$$V_{open\ circuit} = \frac{RT}{2F}\ln(P_{ratio}) \qquad \text{Equation 1}$$

where, R is the gas constant (8.31 J/mol-K), T is the cell operating temperature, F is Faraday's constant (96,487 C/mol). The hot exhaust gas is a source of heat of expansion for the oxygen of the ambient air which is conducted through the MEA stack 9 into the second chamber 22 under the partial pressure differential.

Figure 1:
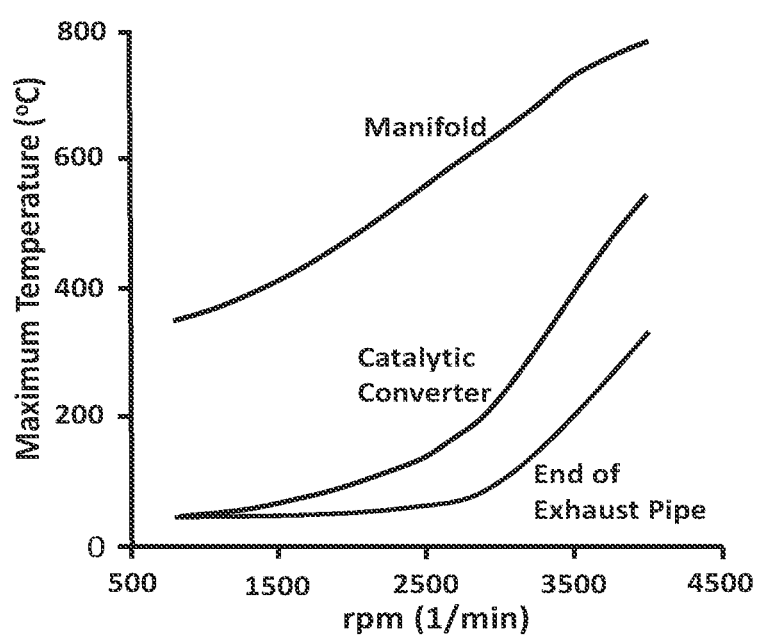
FIG. 1 shows a representative graph of exhaust gas temperatures of a piston-type internal combustion engine as a function of engine speed.

For example, oxygen is 20% of the ambient atmosphere and the partial pressure of oxygen in air is 2.94 psi. On the other, an exhaust gas stream, such as from an internal combustion engine, typically contains approximately 0.5% oxygen and the partial pressure of oxygen is 0.0735 psi. The resulting ratio of oxygen partial pressures between ambient air and a typical engine exhaust stream is therefore 40. As reflected in FIG. 1, the temperature of the exhaust stream of a representative engine running at 2,000 rpm is 500° C. The resulting open circuit voltage for the MEA stack 9, calculated by the Nernst equation, is therefore 123 mV. The resulting electrical energy may be supplied directly to the external load 19 or it may be stored within an energy storage device 17 until needed.

Figure 3:
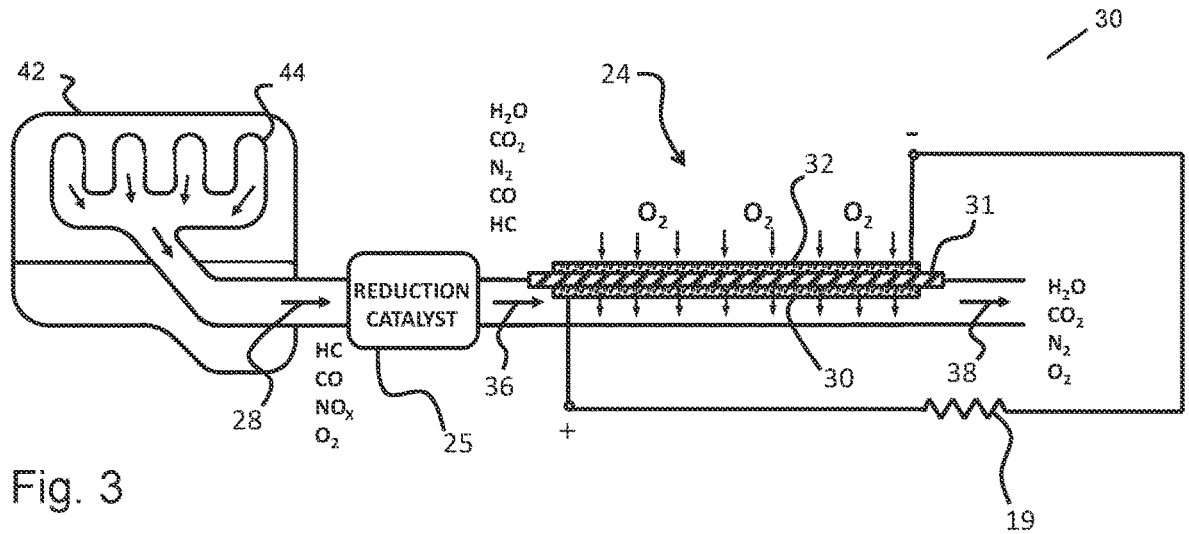
FIG. 3 provides a schematic view of a catalytic converter system including a piston-type internal combustion engine according to a preferred embodiment of the present invention.

Referring to FIG. 3, there is shown a further embodiment of an energy recovery converter 30 for exhaust gases or waste heat, namely a catalytic converter system 30, according to the present invention. The converter system 30 includes a piston-type internal combustion engine 42, a first chamber 25 and a MEA stack 24. The internal combustion engine may be any conventional engine, and includes an exhaust gas manifold 44 through which exhaust gas 28 generated by the engine 42 travels. The exhaust gas 28 generated by the internal combustion engine 42 includes partially combusted fuel (i.e., hydrocarbons), carbon monoxide, nitrous oxide ($NO_x$), carbon dioxide and residual oxygen. The converter system 30 functions as a three-way type catalytic converter capable of recovering waste energy from the exhaust gas stream 28.

The first chamber 25 preferably contains a reduction catalyst, and more preferably finely divided rhodium metal. As such, the first chamber 25 is a catalytic reduction chamber 25 and functions primarily to reduce hydrocarbons and water in the exhaust gas to elemental hydrogen and carbon monoxide, and to reduce nitrogen oxides to nitrogen, carbon dioxide and water.

Thus, the exhaust gas stream 36 leaving the catalytic reduction chamber 25 contains water, carbon monoxide, any remaining fuel and partially combusted hydrocarbons, nitrogen and carbon dioxide. Ideally, only trace amounts of oxygen remain, since any available oxygen would have reacted with the carbon monoxide or hydrocarbons. The exhaust gas stream 36 exiting the catalytic reduction chamber 25 then passes through the MEA stack 24.

The MEA stack 24 essentially serves as an oxidation reaction chamber for oxidizing the exhaust gas stream 36. The MEA stack 24 includes an oxygen ion conductive membrane 31 sandwiched between first and second electrodes 30, 32. Each of the first and second electrodes 30, 32 contains a catalyst, preferably an oxidation catalyst, and more preferably a platinum/palladium catalyst. The membrane 31 essentially serves as an oxygen ion conductive barrier between ambient air and the exhaust gas flow 36, with the first electrode 30 being positioned within and in contact with the flow of the exhaust gas stream 36 and second electrode 32 being exposed to ambient air. Under the oxygen partial pressure differential between ambient air and the exhaust gas stream 36, oxygen enters the second electrode 32 and is oxidized therein by the oxidation catalyst. The resulting oxygen ions are conducted through the membrane 31 as the released electrons are conducted externally to and through the external load 19. The circuit is completed at the first electrode 30, where electrons from the external circuit combine with oxygen ions conducted through the membrane 31 for oxidation reactions (by the oxidation catalyst contained therein) with carbon monoxide and unreacted hydrocarbons at their respective reaction potentials to form a mixture 38 containing water and an increased content of carbon dioxide, as discussed above with respect to the embodiment of FIG. 2.

The catalytic reduction chamber 25 and MEA stack 24 therefore serve the requirements of a catalytic converter by promoting oxidation and reduction of the reaction products in the engine exhaust gas stream. There is also an increase in the oxygen content, due to the excess oxygen which is conducted through the MEA stack 24 under the ambient air/exhaust gas oxygen pressure differential. Electrical energy produced by the conduction of oxygen through the MEA stack 24 may be supplied directly to the external load or it may be stored within energy storage device 17 until needed.

Figure 4:
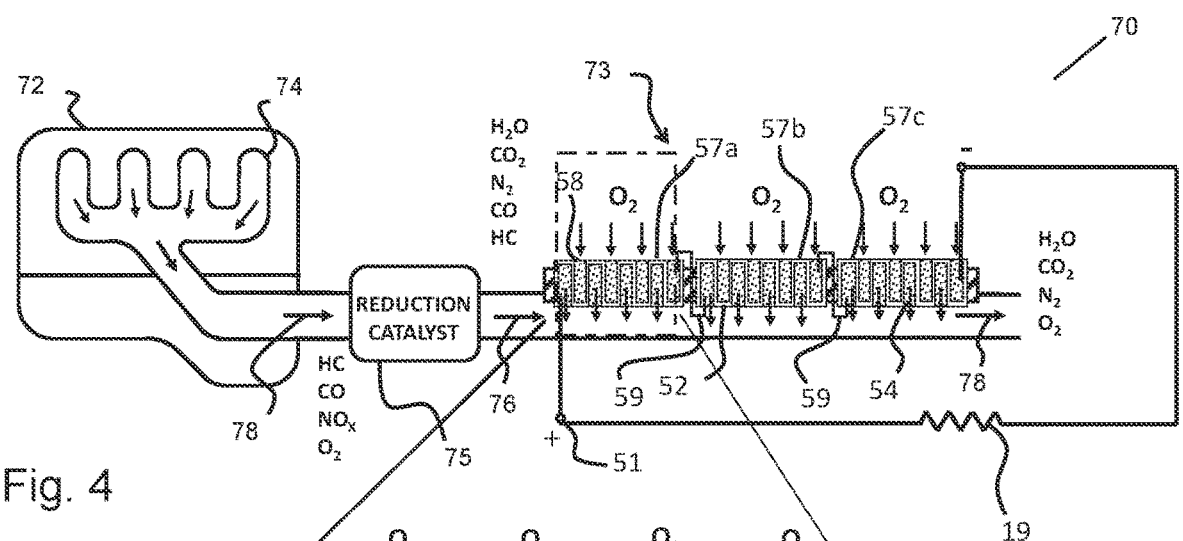
FIG. 4 provides a schematic view of a catalytic converter system including a piston-type internal combustion engine according to another preferred embodiment of the present invention.

Referring to FIG. 4, there is shown another embodiment of an energy recovery converter for exhaust gases or waste heat according to the present invention. The converter 70 comprises an assembly comprising series and parallel electrical connections of MEA stacks in order to generate power at useful voltage and current levels in the form of a MEA stack assembly 73, in addition to a piston-type internal combustion engine 72 and a first chamber 75. Similar to that of the embodiment of FIG. 3, the internal combustion engine includes an exhaust gas manifold 74 through which exhaust gas 78 generated by the engine 72 travels. The exhaust gas 78 generated by the internal combustion engine 72 includes partially combusted fuel (i.e., hydrocarbons), carbon monoxide, nitrous oxide ($NO_x$), carbon dioxide and residual oxygen. The first chamber 75 contains a reduction catalyst, preferably finely divided rhodium, and functions primarily to reduce hydrocarbons and water in the exhaust gas 78 to elemental hydrogen and carbon monoxide, and to reduce nitrogen oxides to nitrogen, carbon dioxide and water.

Thus, the exhaust gas stream 76 leaving the catalytic reduction chamber 75 contains water, carbon monoxide, any remaining fuel and partially combusted hydrocarbons, nitrogen, and carbon dioxide. Ideally, only trace amounts of oxygen remain, since any available oxygen would have reacted with the carbon monoxide or hydrocarbons. The exhaust gas stream 76 exiting the catalytic reduction chamber 75 then passes through an MEA stack assembly 73.

Figure 4A:
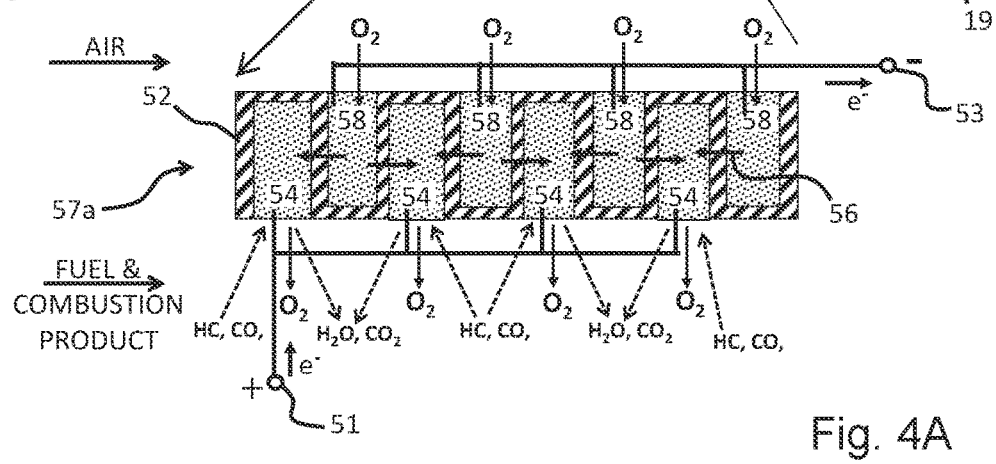
FIG. 4A provides an enlarged view of a section of an MEA stack assembly of the catalytic converter system shown in FIG. 4.

In this embodiment, the MEA stack assembly 73 is configured in a plurality of sections, preferably three sections, 57a, 57b and 57c. The sections 57a, 57b, 57c are preferably electrically connected in series by connectors 59 to yield a higher net output voltage. An enlarged view of section 57a is shown in FIG. 4A, with sections 57b and 57c being identical to section 57a. Referring to FIG. 4A, each section 57a, 57b, 57c of the MEA stack assembly 73 includes a first plurality of electrodes 58 which are electrically connected in parallel with each other and to a negative terminal 53, and a second plurality of electrodes 54 which are electrically connected in parallel with each other and to a positive terminal 51. A membrane 52 is positioned between each pair of first and second electrodes 58, 54. Each of the first and second electrodes 58, 54 contains a catalyst, preferably a platinum/palladium catalyst. The first plurality of electrodes 58 are exposed to ambient air and the second plurality of electrodes 54 are in contact with the exhaust gas.

Due to the ambient air/exhaust gas oxygen pressure differential, oxygen from the ambient air enters the first plurality of electrodes 58. The entering oxygen is oxidized by the catalyst contained within each of the first electrodes 58, the electrons are released to the negative terminal 53 and the oxygen ions 56 are conducted through the respective membrane 52 to the respective second electrode 54. The electrons are then routed through an external circuit via the negative and positive terminals 53 and 51 and ultimately to the respective second electrodes 54, where they combine with the oxygen ions for an oxidation reaction with carbon monoxide and any unreacted hydrocarbons at their respective reaction potentials by the catalyst contained within the second electrodes 54, in the same manner as described above with respect to FIGS. 2 and 3. The second electrodes 54 therefore serve the requirements of a catalytic converter by promoting oxidation reactions of products in the engine exhaust gas stream. As such, the partially combusted fuel (e.g., hydrocarbons) and carbon monoxide undergo reactions with the oxygen conducted through the MEA stack assembly 73 to form a mixture 78 containing water and an increased content of carbon dioxide.

In addition to the oxidation reactions, power is also produced from the oxygen partial pressure differential between the abundant oxygen available from ambient air and the depleted oxygen content of the engine exhaust gas stream in accordance with the Nernst equation, as described above with respect to FIG. 2. The expansion of oxygen through the converter under the partial pressure differential generates electricity directly and results in an increase in oxygen content in the exhaust stream. The electrical energy produced by the MEA stack assembly 73 may be supplied directly to external load 19 or it may be stored within an energy storage device (not shown in FIG. 4) until needed.

Figure 5:
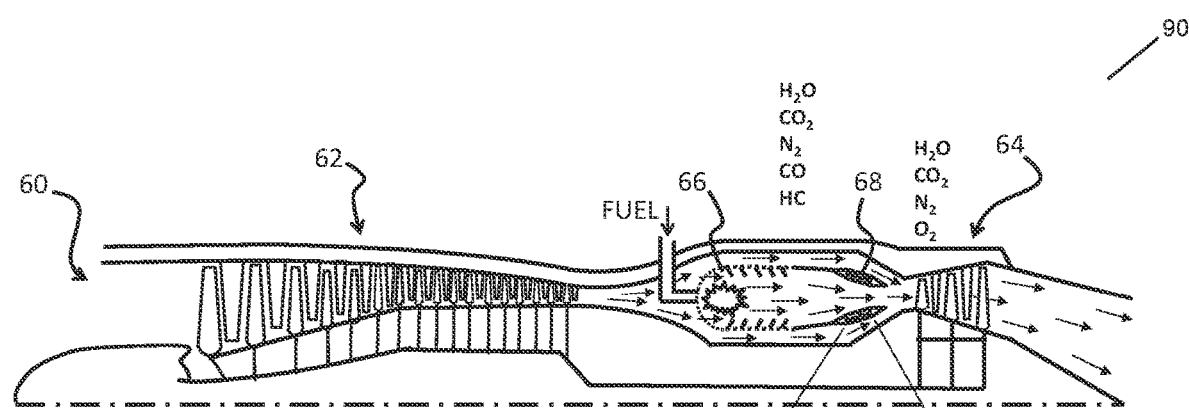
FIG. 5 provides a schematic view of a catalytic converter system including a turbine engine according to a preferred embodiment of the present invention.

Referring to FIG. 5, there is shown another embodiment of an energy recovery converter for exhaust gases or waste heat according to the present invention. The converter is part of and configured to extract energy from a turbine engine 90. The turbine engine 90 includes air intake section 60, a turbine air compressor section 62, a combustion chamber 66, a catalytic reduction section (not shown, but similar to the catalytic reduction section 25 shown in FIG. 3) and a power turbine section 64. Fuel and a portion of the compressed air from the compressor section 62 are supplied to the combustion chamber 66 where the fuel is burned. The rest of the compressed air flows around the outside of the combustion chamber 66.

The exhaust in the combustion chamber 66 includes water ($H_2O$) and carbon dioxide ($CO_2$) from the hydrocarbon fuel/oxygen burning reaction. Further, nitrogen and oxygen in the ambient intake air react at high temperatures in the combustion chamber 66 to produce nitrous oxide ($NO_x$). Incomplete fuel combustion products, such as carbon monoxide (CO) and hydrocarbons (HC), are also present in the engine exhaust in the combustion chamber 66. The combustion process renders the exhaust substantially depleted of oxygen.

Figure 5A:
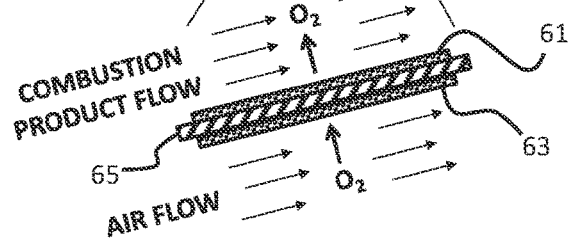
FIG. 5A provides an enlarged view of enlarged view of an MEA stack of the catalytic converter system shown in FIG. 5.

The converter includes a MEA stack assembly, and more particularly first and second MEA stacks 68. The first and second MEA stacks 68 are positioned in the wall of the combustion chamber 66, particularly in the post-ignition region. An enlarged view of the one of the MEA stacks 68 is shown in FIG. 5A. Each of the MEA stacks 68 includes an ion conductive membrane 65 sandwiched between a pair of electrodes 61, 63. Each MEA stack 68 is positioned such that the first electrode 61 is exposed to the turbine engine combustion exhaust gases and the second electrode 63 is exposed to the compressed air flow.

The membrane 65 of each MEA stack 68 is an oxygen ion conductive barrier between ambient air and the exhaust gas flow. Each of the first and second electrodes 61 and 63 contains a catalyst, preferably an oxidation catalyst, and more preferably a platinum/palladium catalyst. Under the oxygen partial pressure differential between compressed air and the exhaust gas, oxygen enters the second electrode 63 and is oxidized therein, and the resulting oxygen ions are conducted through the membrane 65 while the released electrons are conducted externally through a load (not shown in FIG. 5). The circuit is completed at the first electrode 61, where electrons from the external circuit combine with the oxygen ions for oxidation reactions with carbon monoxide and any unreacted hydrocarbons in the exhaust stream at their respective reaction potentials to form a mixture containing water and an increased carbon dioxide content. The first electrode 61 of each MEA stack 68 serves the requirements of a catalytic converter by promoting oxidation of the reaction products in the engine exhaust stream.

In addition to the oxidation reactions, power is also produced from the oxygen partial pressure differential between the abundant oxygen available from ambient air and the depleted oxygen content of the engine exhaust stream in accordance with the Nernst equation. The expansion of oxygen through the converter under the partial pressure differential generates electricity directly and results in an increase in the oxygen content in the gases exiting the combustion chamber 66.

Figure 6:
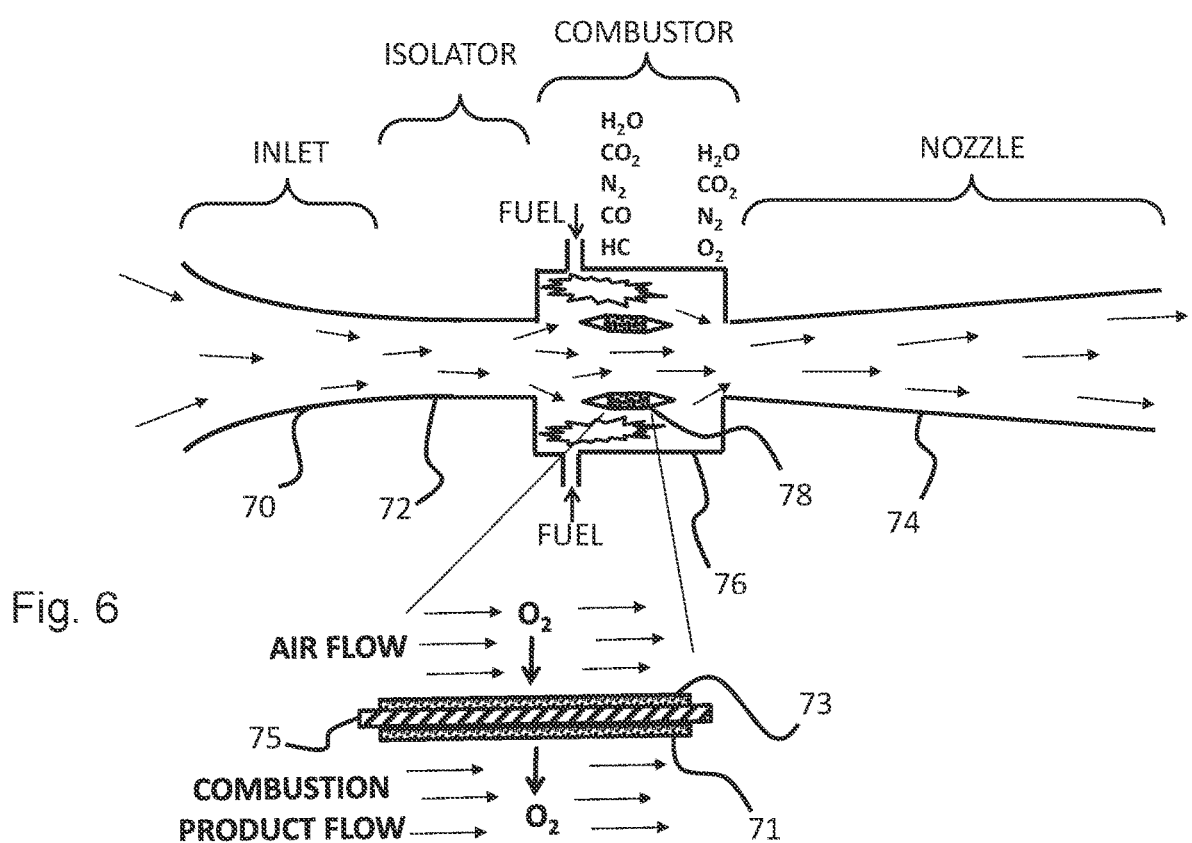
FIG. 6 provides a schematic view of a catalytic converter system including a scram jet engine according to a preferred embodiment of the present invention.

Referring to FIG. 6, there is shown another embodiment of an energy recovery converter for exhaust gases or waste heat according to the present invention. The converter is part of and configured to extract energy from a scram jet engine. The scram jet engine includes an air inlet section 70, an isolator section 72, a combustor section 76 and a nozzle section 74. The converter also includes a MEA assembly, namely first and second MEA stacks 78. The MEA stacks 78 partially separate the flow through the combustion section 76 into a fuel burning region and an air flow-through region. Fuel and a portion of the air from isolator section 72 are supplied to the fuel burning region. The remaining portion of the air passes on the opposite side of each MEA stack 78, such that a first electrode 71 of each stack 78 is exposed to the combustion gases and a second electrode 73 of each stack 78 is exposed to oxygen-rich air flow provided directly from the isolator section 72.

A membrane 75 which is positioned between the first and second electrodes 71, 73 of each MEA stack 78 is an oxygen ion conductive barrier which separates oxygen-rich air flow exposed to the second electrode 73 from the oxygen-depleted post-combustion gas flow exposed to the first electrode 71. Each of the first and second electrodes 71, 73 contains a catalyst, preferably an oxidation catalyst, and more preferably a platinum/palladium catalyst. Under the oxygen partial pressure differential between the air from the isolator section 72 and the exhaust gas, oxygen enters the second electrode 73 and is oxidized therein by the catalyst contained therein, and the resulting oxygen ions are conducted through the ion conductive membrane 75 to the first electrode 71, while the released electrons are conducted externally through a load (not shown in FIG. 6). The circuit is completed at the first electrode 71, where electrons from the external circuit combine with the oxygen ions conducted through the ion conductive membrane 75 for oxidation reactions with carbon monoxide and any unreacted hydrocarbons in the combustion gas stream at their respective reaction potentials. The converter includes a catalytic reduction section and exhaust gas composition as described above with respect to FIGS. 3-5.

The first electrode 71 serves the requirements of a catalytic converter by promoting oxidation of the reaction products in the engine exhaust stream. As such, the partially combusted fuel (e.g., hydrocarbons) and carbon monoxide undergo reactions with the oxygen conducted through the MEA to form a mixture containing water and an increased carbon dioxide content.

In addition to the oxidation reactions, power is also produced from the oxygen partial pressure differential between the abundant oxygen available from ambient air and the depleted oxygen content of the fuel combustion products, in accordance with the Nernst equation. The expansion of oxygen through the converter under the partial pressure differential generates electricity directly.

Any of the above-described converters/systems may be suitable for supplying processing heat to an industrial facility. An exemplary facility would one in which heat is needed for processing and separating metal from raw ore, wood or paper drying processes. Essentially, an industrial processing facility that produces oxygen-depleted gas from the oxygen-rich gas in the process of burning fuel as a source of process heat. The residual heat and incomplete combustion products are often wasted.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An energy recovery converter for exhaust gases, the converter comprising:
   a catalytic reduction chamber;
   a membrane electrode assembly downstream of the catalytic reduction chamber, the membrane electrode assembly including an anode, a cathode and an oxygen ion conductive membrane sandwiched between the anode and cathode, each of the anode and cathode including at least one oxidation catalyst configured to promote an electrochemical reaction;
   an exhaust gas having a first molecular oxygen content, the cathode of the membrane electrode assembly being exposed to the exhaust gas and the anode of the membrane electrode assembly being exposed to a gas having a second molecular oxygen content, the second molecular oxygen content being higher than the first molecular oxygen content; and
   an external electrical load connected between the anode and cathode of the membrane electrode assembly.

2. The energy recovery converter according to claim 1, wherein the exhaust gas includes hydrocarbons, nitrogen oxides and water.

3. The energy recovery converter according to claim 1, wherein the at least one oxidation catalyst is selected from the group consisting of platinum, palladium, metal oxides, transition metal macrocycles and chalgogenides.

4. The energy recovery converter according to claim 1, wherein the catalytic reduction chamber contains a reduction catalyst selected from the group consisting of rhodium and platinum.

5. The energy recovery converter according to claim 4, wherein the reduction catalyst is rhodium.

6. A method for purifying exhaust gas from a mechanical engine using a converter,
   the converter comprising: a catalytic reduction chamber;
      a membrane electrode assembly including an anode, a cathode and an oxygen ion conductive membrane sandwiched between the anode and cathode, each of the anode and cathode including at least one oxidation catalyst configured to promote an electrochemical reaction;

an exhaust gas containing hydrocarbons, nitrogen oxides and water, the exhaust gas having a first molecular oxygen content, the cathode of the membrane electrode assembly being exposed to the exhaust gas, the anode of the membrane electrode assembly being exposed to a gas having a second molecular oxygen content such that oxygen contained within the gas enters the anode, the second molecular oxygen content being higher than the first molecular oxygen content; and an external electrical load connected between the anode and cathode of the membrane electrode assembly, the method comprising:

transporting the exhaust gas to the catalytic reduction chamber, such that the hydrocarbons, nitrogen oxides and water of the exhaust gas are converted to reaction gases, the reaction gases being elemental hydrogen, carbon monoxide, carbon dioxide and elemental nitrogen;

transporting a stream containing the reaction gases, water and any unburned hydrocarbons from the catalytic reduction chamber to the cathode;

oxidizing the oxygen from the gas having the second molecular oxygen content to produce oxygen ions, such that the oxygen ions are conducted through the oxygen ion conductive membrane and electrons are simultaneously released to the external electrical circuit; and transporting the electrons from the external electrical circuit to the anode to combine with the oxygen ions and for an oxidation reaction with the carbon monoxide and unburned hydrocarbons at their respective reaction potentials.

7. The method according to claim 6, wherein the at least one oxidation catalyst is selected from the group consisting of platinum, palladium, metal oxides, transition metal macrocycles and chalgogenides.

8. The method according to claim 6, wherein the catalytic reduction chamber contains a catalyst selected from the group consisting of rhodium and platinum.

9. The method according to claim 8, wherein the catalyst is rhodium.

* * * * *